US012710092B2

(12) United States Patent
Shimozono et al.

(10) Patent No.: US 12,710,092 B2
(45) Date of Patent: Aug. 18, 2026

(54) POWER TRANSMISSION DEVICE

(71) Applicant: JATCO Ltd, Shizuoka (JP)

(72) Inventors: Kazutoshi Shimozono, Yokohama (JP); Minoru Shoichi, Hiratsuka (JP)

(73) Assignee: JATCO Ltd, Fuji City (JP)

( * ) Notice: Subject to any disclaimer, the term of this patent is extended or adjusted under 35 U.S.C. 154(b) by 0 days.

(21) Appl. No.: 18/844,166

(22) PCT Filed: Nov. 29, 2022

(86) PCT No.: PCT/JP2022/044065

§ 371 (c)(1),
(2) Date: Sep. 5, 2024

(87) PCT Pub. No.: WO2023/171054

PCT Pub. Date: Sep. 14, 2023

(65) Prior Publication Data

US 2025/0180098 A1 Jun. 5, 2025

(30) Foreign Application Priority Data

Mar. 9, 2022 (JP) ................................ 2022-035857

(51) Int. Cl.
*F16H 3/46* (2006.01)

(52) U.S. Cl.
CPC ....... *F16H 3/46* (2013.01); *F16H 2200/2007* (2013.01); *F16H 2200/203* (2013.01)

(58) Field of Classification Search
CPC ............... F16H 3/62; F16H 2200/2007; F16H 2200/2038; F16H 2200/2033; F16H 2200/2084
See application file for complete search history.

(56) References Cited

U.S. PATENT DOCUMENTS 5,224,908 A * 7/1993 Nishida .................. F16H 3/666 475/282
5,857,934 A * 1/1999 Ohkubo .................. F16H 61/62 475/36
6,290,044 B1 * 9/2001 Burgman ............. F16D 41/125 192/85.48
9,005,071 B2 * 4/2015 Smemo ..................... F16H 3/66 475/271
9,631,708 B2 * 4/2017 Kato ....................... F16H 3/666

FOREIGN PATENT DOCUMENTS

CN 106979285 A 7/2017
CN 111396516 A 7/2020
DE 10 2018 117 051 A1 1/2020

* cited by examiner

*Primary Examiner* — Huan Le
(74) *Attorney, Agent, or Firm* — Foley & Lardner LLP

(57) ABSTRACT

A device includes: a first planetary gear mechanism including a first sun gear connected to an input shaft, a first carrier connected to an output shaft, and a first ring gear; and a second planetary gear mechanism including a second sun gear connected to the input shaft, a second carrier connected to a first fixed element via a first engagement element, and a second ring gear connected to a second fixed element via a second engagement element, the first planetary gear mechanism and the second planetary gear mechanism are connected by the first ring gear and the second carrier, and the first sun gear and the first ring gear are connected by a third engagement element.

14 Claims, 5 Drawing Sheets

| | SOWC 63 (FIRST ENGAGEMENT ELEMENT) | SOWC 64 (SECOND ENGAGEMENT ELEMENT) | CLUTCH (THIRD ENGAGEMENT ELEMENT) |
|---|---|---|---|
| FIRST GEAR | ● | | |
| SECOND GEAR | | ● | |
| THIRD GEAR | | | ● |

S1 : FIRST SUN GEAR 41
C1 : FIRST CARRIER 45
R1 : FIRST RING GEAR 42
S2 : SECOND SUN GEAR 51
C2 : SECOND CARRIER 55
R2 : SECOND RING GEAR 52

POWER TRANSMISSION DEVICE

TECHNICAL FIELD

The present invention relates to a device.

BACKGROUND ART

Patent Document 1 discloses a device including a gear mechanism that transmits power (rotation force) generated by a motor. The gear mechanism changes a speed of rotation input from the motor via an input shaft, and outputs the rotation to a differential mechanism via an output shaft. The device includes a clutch (lock-up clutch) that equalizes rotation speeds of the input shaft and the output shaft.

PRIOR ART DOCUMENT

Patent Document

Patent Document 1: CN 106979285 A

SUMMARY OF INVENTION

When the clutch is engaged in a state in which a difference between the rotation speeds of the input shaft and the output shaft is large, a shock caused by the engagement is large. The shock can be mitigated by reducing the difference between the rotation speeds before engaging the clutch, but a time for engaging the clutch becomes longer.

In a device, it is required to appropriately set a time for engaging a clutch while reducing a shock that occurs when the clutch is engaged.

A device according to an aspect of the present invention includes:

- a first planetary gear mechanism including a first sun gear connected to an input shaft, a first carrier connected to an output shaft, and a first ring gear; and
- a second planetary gear mechanism including a second sun gear connected to the input shaft, a second carrier connected to a first fixed element via a first engagement element, and a second ring gear connected to a second fixed element via a second engagement element, in which
- the first planetary gear mechanism and the second planetary gear mechanism are connected by the first ring gear and the second carrier, and
- the first sun gear and the first ring gear are connected by a third engagement element.

According to an aspect of the present invention, it is possible to appropriately set a time for engaging the clutch while reducing a shock that occurs when the clutch as a third engagement element is engaged.

DESCRIPTION OF EMBODIMENTS

Figure 1:
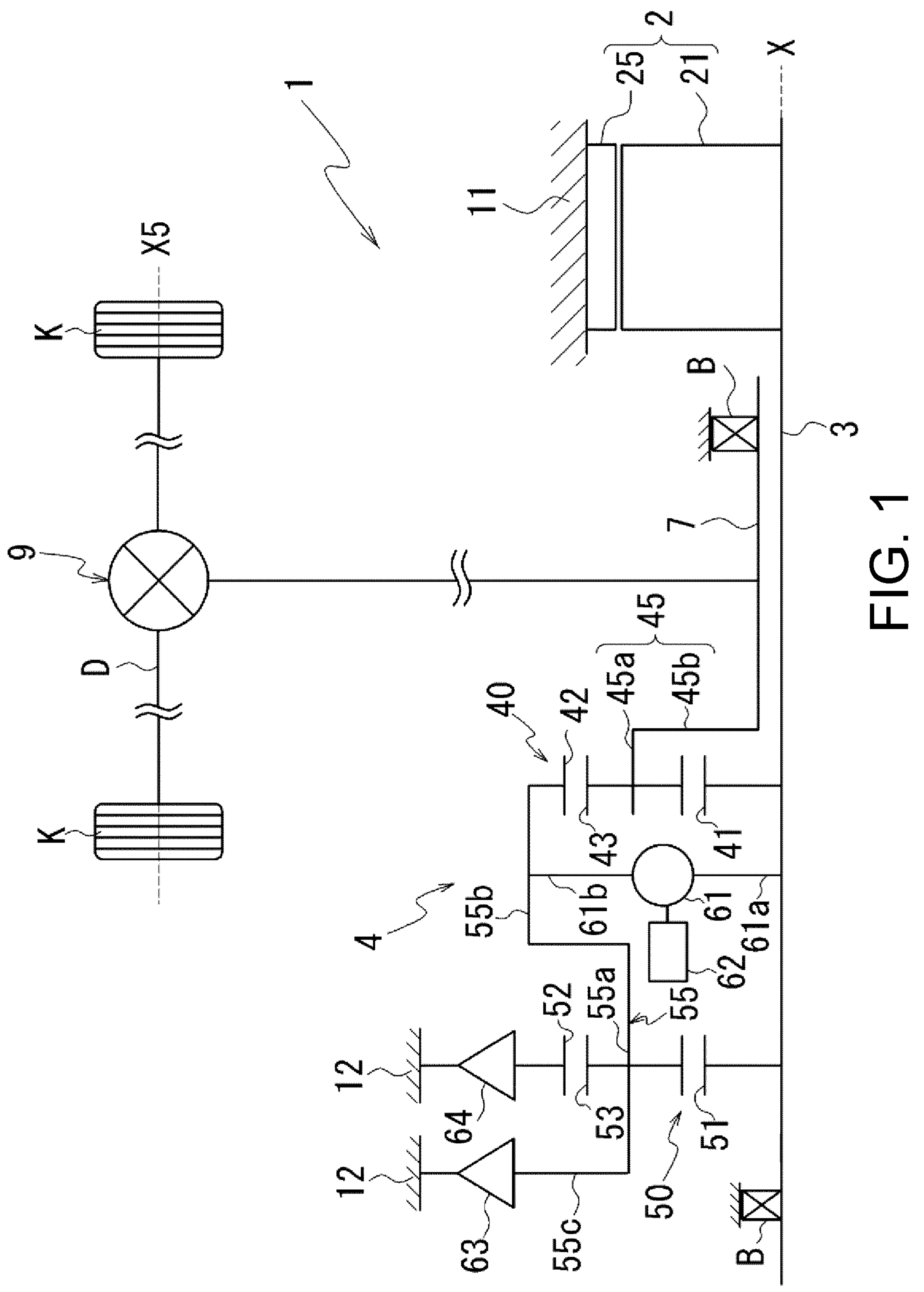
FIG. 1 is a skeleton diagram showing a power transmission device.

In the following description, an example in which an device according to an aspect of the present invention is applied to a power transmission device mounted on a vehicle will be described. The power transmission device includes a motor that is a rotation electrical machine, and a power transmission mechanism that transmits power of the motor to a drive wheel. The power transmission mechanism includes, for example, a gear mechanism and/or a differential mechanism (differential gear mechanism).

In the following description, when referring to a second element (member, portion, or the like) connected to a first element (member, portion, or the like), a second element (member, portion, or the like) connected downstream of a first element (member, portion, or the like), or a second element (member, portion, or the like) connected upstream of a first element (member, portion, or the like), it is meant that the first element and the second element are connected to each other in a power-transmissible manner. A power input side is upstream, and a power output side is downstream. Further, the first element and the second element may be connected to each other via another element (clutch, other gear mechanism, or the like).

"Overlapping when viewed from a predetermined direction" means that a plurality of elements are arranged in a predetermined direction, and has the same meaning as "overlapping in a predetermined direction". The "predetermined direction" is, for example, an axial direction, a radial direction, a gravity direction, or a vehicle traveling direction (vehicle forward direction and vehicle backward direction).

If a drawing shows that a plurality of elements (member, portion, or the like) are arranged in a predetermined direction, it can be considered that in explanation of the description, there is a sentence illustrating that the plurality of elements overlap when viewed from the predetermined direction.

"Not overlapping when viewed from a predetermined direction" and "offset when viewed from a predetermined direction" mean that a plurality of elements are not arranged in a predetermined direction, and has the same meaning as "not overlapping in a predetermined direction" and "offset in a predetermined direction". The "predetermined direction" is, for example, an axial direction, a radial direction, a gravity direction, or a vehicle traveling direction (vehicle forward direction and vehicle backward direction).

If a drawing shows that a plurality of elements (member, portion, or the like) are not arranged in a predetermined direction, it can be considered that in explanation of the description, there is a sentence illustrating that the plurality of elements do not overlap when viewed from the predetermined direction.

"When viewed from a predetermined direction, a first element (member, portion, or the like) is positioned between a second element (member, portion, or the like) and a third element (member, portion, or the like)" means that the first element can be observed to be between the second element and the third element when viewed from the predetermined direction. The "predetermined direction" is, for example, an axial direction, a radial direction, a gravity direction, or a vehicle traveling direction (vehicle forward direction and vehicle backward direction).

For example, when the second element, the first element, and the third element are arranged in this order along the axial direction, it can be said that the first element is positioned between the second element and the third element when viewed from the radial direction. If a drawing shows that a first element is between a second element and a third element when viewed from a predetermined direction, it can be considered that in explanation of the description, there is a sentence illustrating that the first element is between the second element and the third element when viewed from the predetermined direction.

When two elements (member, portion, or the like) overlap when viewed from the axial direction, the two elements are coaxial.

The "axial direction" means an axial direction of a rotation axis of a member that constitutes the device. The "radial direction" means a direction orthogonal to the rotation axis of the member that constitutes the device. The member is, for example, a motor, a gear mechanism, or a differential gear mechanism.

FIG. 1 is a skeleton diagram showing a power transmission device 1.

As shown in FIG. 1, the power transmission device 1 includes a motor 2 (rotation electrical machine) which is a power source that drives a vehicle. The power transmission device 1 includes an input shaft 3, a gear mechanism 4, an output shaft 7, a differential mechanism 9, and a drive shaft D as a power transmission mechanism that transmits output rotation of the motor 2.

The input shaft 3, the gear mechanism 4, and the output shaft 7 are disposed coaxially with a rotation axis X of the motor 2. The motor 2 is disposed on one side (right side in the drawing) in a direction of the rotation axis X of the power transmission device 1, and the gear mechanism 4 is disposed on the other side (left side in the drawing). The motor 2 is connected to the gear mechanism 4 via the input shaft 3. The gear mechanism 4 is connected to the differential mechanism 9 via the output shaft 7. The rotation axis X extends along a vehicle width direction.

The output shaft 7 is connected to the differential mechanism 9 via a reduction gear, a counter gear, and the like (not shown). The reduction gear, the counter gear, and the like are provided along a vehicle front-rear direction, which is a direction orthogonal to the rotation axis X.

The differential mechanism 9 is connected to left and right drive wheels K, K of the vehicle via the drive shaft D. The drive shaft D extends along an axis X5 parallel to the rotation axis X.

The motor 2 includes a rotor core 21 that is externally fitted to the input shaft 3, and a stator core 25 that surrounds an outer periphery of the rotor core 21 with a gap therebetween.

When the motor 2 is driven and the rotor core 21 rotates around the rotation axis X, the input shaft 3 rotates integrally with the rotor core 21. A speed of the rotation input from the input shaft 3 is changed by the gear mechanism 4 and the rotation is output to the output shaft 7. The rotation output to the output shaft 7 is decelerated by a reduction gear, a counter gear, and the like (not shown), and is transmitted to the differential mechanism 9. The rotation transmitted to the differential mechanism 9 is transmitted to the left and right drive wheels K, K of the vehicle via the drive shaft D.

The gear mechanism 4 is located downstream of the motor 2 in a power transmission path for transmitting a rotation force of the motor 2. The differential mechanism 9 is located downstream of the gear mechanism 4 in the power transmission path.

The output shaft 7 may have, for example, a hollow cylindrical shape. The input shaft 3 extending from the motor 2 in the direction of the rotation axis X penetrates an inside of the output shaft 7 and is connected to the gear mechanism 4. The input shaft 3 and the output shaft 7 are provided so as to be rotatable relative to each other around the rotation axis X. When viewed from a radial direction of the rotation axis X, a part of the input shaft 3 overlaps with the output shaft 7. In other words, the power transmission device 1 has a structure in which the input shaft 3 extends from the motor 2 toward the gear mechanism 4, and the output shaft 7 is folded back from the gear mechanism 4 toward the motor 2.

According to this folded structure, the output shaft 7 is disposed between the motor 2 located on the one side in the direction of the rotation axis X of the power transmission device 1 and the gear mechanism 4 located on the other side. In other words, the output shaft is disposed in a central portion of the power transmission device 1.

Further, the differential mechanism 9 connected to the output shaft 7 via the reduction gear, the counter gear, and the like (not shown) is disposed in the central portion of the drive shaft D in the direction of the axis X5 (vehicle width direction).

As shown in FIG. 1, the power transmission device 1 includes a motor case 11 that accommodates the motor 2 and a gear case 12 that accommodates the gear mechanism 4. The input shaft 3 and the output shaft 7 are supported by the motor case 11 or the gear case 12 via a bearing B. Although not shown, the differential mechanism 9 is accommodated in, for example, an axle case separate from the gear case 12.

The gear mechanism 4 includes a first planetary gear mechanism 40 (hereinafter, also simply referred to as a "first gear mechanism 40") and a second planetary gear mechanism 50 (hereinafter, also simply referred to as a "second gear mechanism 50"). The first gear mechanism 40 and the second gear mechanism 50 are arranged side by side on the rotation axis X. The first gear mechanism 40 is disposed between the motor 2 and the second gear mechanism 50 in the direction of the rotation axis X. The first gear mechanism 40 and the second gear mechanism 50 overlap with the motor 2 when viewed from the direction of the rotation axis X.

The first gear mechanism 40 includes a first sun gear 41, a first carrier 45, and a first ring gear 42.

The first sun gear 41 is fixed to an outer periphery of the input shaft 3 by, for example, spline fitting.

The first carrier 45 includes a holding portion 45*a* that holds a pinion gear 43, and a connecting portion 45*b* that extends radially inward from the holding portion 45*a* and is connected to the output shaft 7. The pinion gear 43 meshes with an outer periphery of the first sun gear 41. The pinion gear 43 is provided so as to be revolvable in a circumferential direction around the rotation axis X, and is provided so as to be rotatable about an axis thereof.

An inner periphery of the first ring gear 42 meshes with the pinion gear 43. The first ring gear 42 is provided so as to be rotatable integrally with a second carrier 55 to be described later.

As described above, in the first gear mechanism 40, the first sun gear 41 fixed to the input shaft 3 is an input element, and the first carrier 45 connected to the output shaft 7 is an output element.

The second gear mechanism 50 includes a second sun gear 51, the second carrier 55, and a second ring gear 52.

The second sun gear 51 is fixed to the outer periphery of the input shaft 3 by, for example, spline fitting. That is, the input shaft 3 is provided in manner of penetrating inner peripheries of the first sun gear 41 and the second sun gear 51 in the direction of the rotation axis X.

The second carrier 55 includes a holding portion 55*a* that holds a pinion gear 53, a first connecting portion 55*b*, and a second connecting portion 55*c*. The pinion gear 53 meshes with an outer periphery of the second sun gear 51. The pinion gear 53 is provided so as to be revolvable in the circumferential direction around the rotation axis X, and is provided so as to be rotatable about an axis thereof.

An inner periphery of the second ring gear 52 meshes with the pinion gear 53.

The first connecting portion 55*b* of the second carrier 55 is provided on a motor 2 side of the holding portion 55*a* in the direction of the rotation axis X. The first connecting portion 55*b* connects the holding portion 55*a* to the first ring gear 42 of the first gear mechanism 40. The first connecting portion 55*b* allows the second carrier 55 and the first ring gear 42 to rotate integrally.

That is, in the second gear mechanism 50, the second sun gear 51 fixed to the input shaft 3 is an input element, and the second carrier 55 connected to the first ring gear 42 of the first gear mechanism 40 is an output element.

A clutch 61 (third engagement element) is provided on an inner diameter side of the first connecting portion 55*b*. An input end 61*a* of the clutch 61 is fixed to the input shaft 3, and an output end 61*b* is fixed to the first connecting portion 55*b* of the second carrier 55. As described above, the first sun gear 41 is fixed to the input shaft 3, and the first ring gear 42 is connected to the first connecting portion 55*b*. Therefore, the first sun gear 41 and the first ring gear 42 are connected to the clutch 61 via the input shaft 3 and the first connecting portion 55*b*.

An electric actuator 62 is connected to the clutch 61. The clutch 61 and the electric actuator 62 are disposed between the first gear mechanism 40 and the second gear mechanism 50 in the direction of the rotation axis X. The clutch 61 and the electric actuator 62 are disposed at positions overlapping with the first gear mechanism 40 and the second gear mechanism 50 in the direction of the rotation axis X.

The clutch 61 is operated by the electric actuator 62, and is switched between an engaged state and a released state. An operation on the clutch 61 performed by the electric actuator 62 is controlled by a control device (not shown). When the clutch 61 is engaged, the input shaft 3 and the first connecting portion 55*b* of the second carrier 55 are engaged. Accordingly, the first sun gear 41 fixed to the input shaft 3, the second sun gear 51, the second carrier 55, and the first ring gear 42 rotate integrally. Although details will be described later, the clutch 61 functions as a lock-up clutch that matches the rotation speeds of the input shaft 3 and the output shaft 7.

The second connecting portion 55*c* of the second carrier 55 is provided on an opposite side of the first connecting portion 55*b* of the holding portion 55*a* in the direction of the rotation axis X. The second connecting portion 55*c* connects the holding portion 55*a* to a selectable one way clutch 63 as a first engagement element (hereinafter also referred to as "SOWC 63"). The second carrier 55 is supported by the gear case 12 (first fixed element) via the SOWC 63.

The SOWC 63 is operated by an actuator (not shown), and is switched among an engaged state, a released state, and an engagement state.

In the engaged state, the second carrier 55 and the first ring gear 42 connected to the second carrier 55 are non-rotatably fixed to the gear case 12.

In the released state, the second carrier 55 and the first ring gear 42 are rotatable in either one direction or the other direction relative to the gear case 12.

In the engagement state, the second carrier 55 and the first ring gear 42 are rotatable in only one direction relative to the gear case 12.

An outer periphery of the second ring gear 52 is connected to a selectable one way clutch 64 (hereinafter also referred to as "SOWC 64") that is a second engagement element. The second ring gear 52 is supported by the gear case 12 (second fixed element) via the SOWC 64.

The SOWC 64 is operated by an actuator (not shown), and is switched between an engaged state, a released state, and an engagement state.

In the engaged state, the second ring gear 52 is non-rotatably fixed to the gear case 12.

In the released state, the second ring gear 52 is rotatable in either one direction or the other direction relative to the gear case 12.

In the engagement state, the second ring gear 52 is rotatable only in one direction relative to the gear case 12.

Operations on the SOWC 63, 64 by the actuator are controlled by a control device (not shown).

The SOWC 63, 64 may include, for example, a waiting mechanism formed by a spring or the like. The waiting mechanism is a mechanism that accumulates a thrust applied from the actuator. The SOWC 63, 64 can quickly switch between the released state, the engaged state, and the engagement state by the waiting mechanism.

A gear ratio of the first gear mechanism 40 is set to be larger than a gear ratio of the second gear mechanism 50.

In a planetary gear mechanism, the smaller the value ($\lambda$ value) obtained by dividing the number of teeth of a sun gear by the number of teeth of a ring gear, the larger the gear ratio. That is, a $\lambda$ value of the first gear mechanism 40 (the number of teeth of the first sun gear 41/the number of teeth of the first ring gear 42) is set to be smaller than a $\lambda$ value of the second gear mechanism 50 (the number of teeth of the second sun gear 51/the number of teeth of the second ring gear 52).

The gear mechanism 4 has, as three gear positions having different gear ratios (output rotation speed/input rotation speed), a first gear position, a second gear position, and a third gear position. Switching to each gear position is performed by operating the SOWC 63, 64 and the clutch 61. In the following description, the "first gear position", the "second gear position", and the "third gear position" are simply referred to as a "first gear", a "second gear", and a "third gear".

Figures 2, 3:
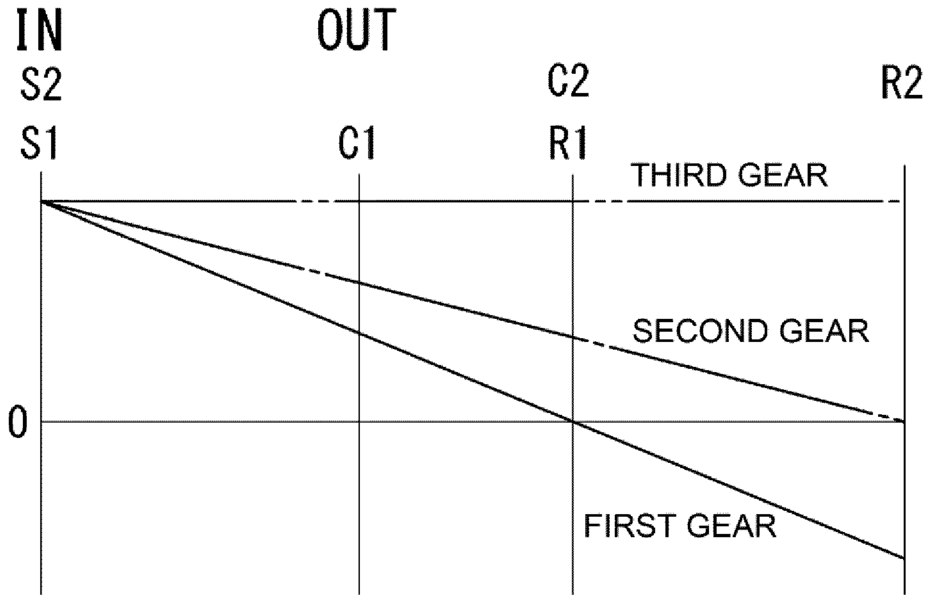
FIG. 2 is an engagement table of engagement elements in first to third gears.
FIG. 3 is a collinear diagram showing a speed of rotation (rotation speed) of each element of a gear mechanism in the first to third gears.

FIG. 2 is an engagement table of the engagement elements (SOWC 63, 64 and clutch 61) in the first to third gears.

In FIG. 2, a black circle is displayed in a column for an engaged state element. A column for a released state element is blank.

FIG. 3 is a collinear diagram showing a speed of rotation (rotation speed) of each element of the gear mechanism 4 in the first to third gears. The number 0 on each vertical axis means that the speed of rotation is 0. A side above 0 indicates rotation in one direction DA, which will be described later, and a side below 0 indicates rotation in the other direction DB, which will be described later. For convenience of description, speeds of rotation of the input shaft 3 in the first to third gears are the same.

Figure 4:
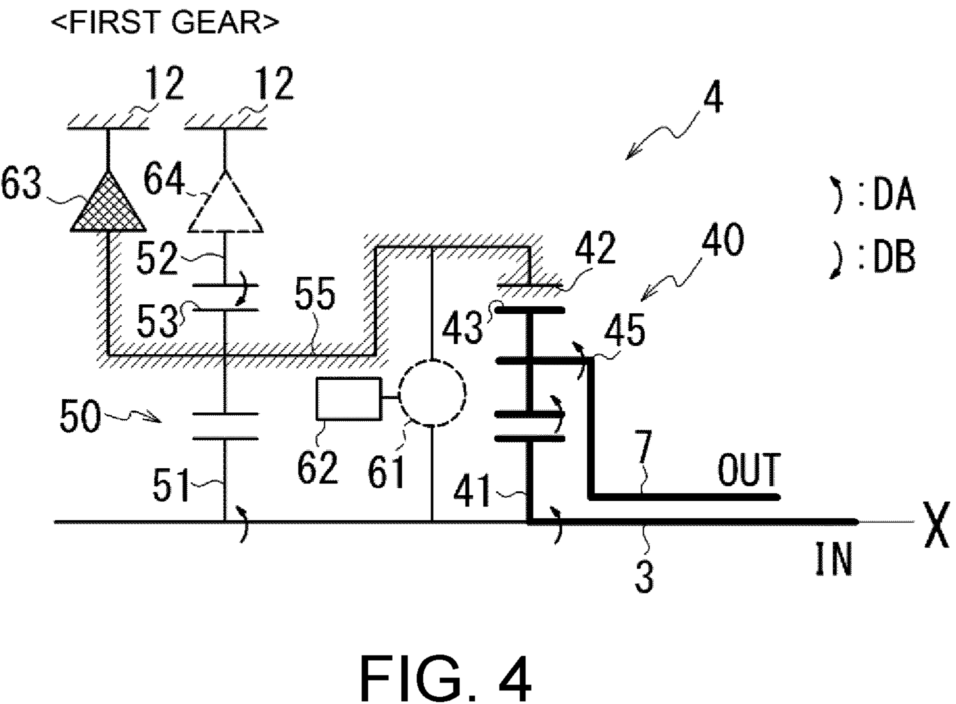
FIG. 4 is a diagram showing a power transmission path in the first gear.

FIG. 4 is a diagram showing a power transmission path in the first gear.

Figure 5:
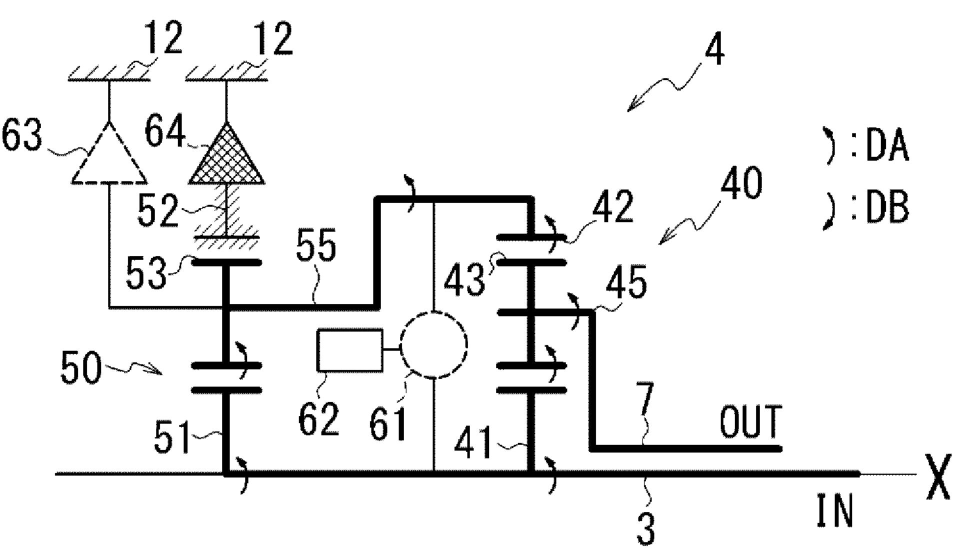
FIG. 5 is a diagram showing a power transmission path in the second gear.

FIG. 5 is a diagram showing a power transmission path in the second gear.

Figure 6:
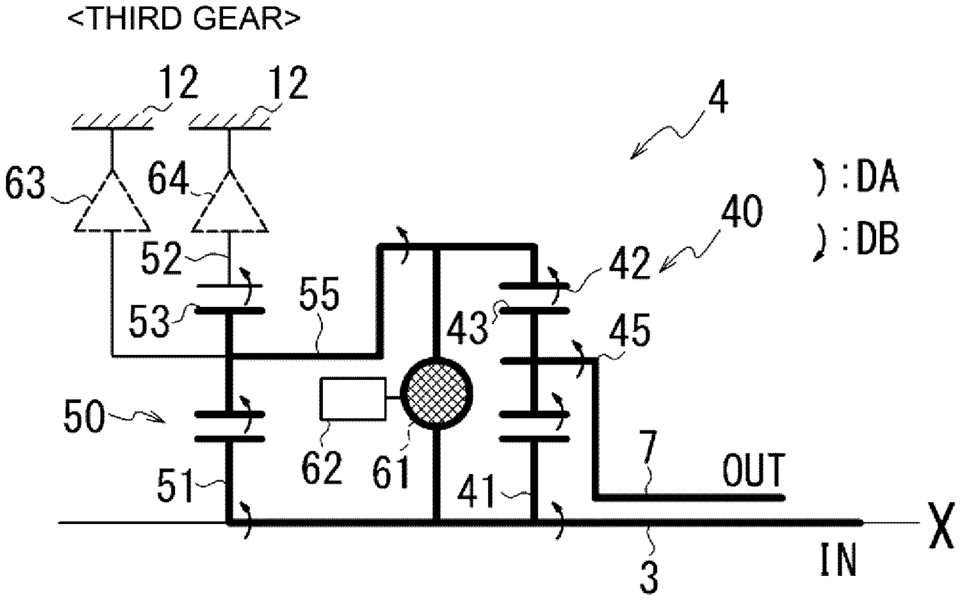
FIG. 6 is a diagram showing a power transmission path in the third gear.

FIG. 6 is a diagram showing a power transmission path in the third gear.

In FIGS. 4 to 6, the power transmission path is indicated by a thick line. Moreover, among the SOWC 63, 64 and the clutch 61, elements in the released state are indicated by dashed lines, and elements in the engaged state are indicated by cross-hatching. Further, elements of the first gear mechanism 40 and the second gear mechanism 50 that are non-rotatably fixed are shown with hatching.

As shown in FIG. 3, speeds of rotation of the first sun gear 41 and the second sun gear 51 correspond to the input rotation speed (IN) from the input shaft 3 to the gear mechanism 4. The speed of rotation of the first carrier 45 corresponds to the output rotation speed (OUT) from the gear mechanism 4 to the output shaft 7. In the gear mechanism 4, the gear ratio (OUT/IN) in the first gear is the smallest, and the gear ratio in the third gear is the largest. The gear ratio in the second gear is set to be higher than that in the first gear and smaller than that in the third gear. The third gear is set to a gear ratio 1 in which the input rotation speed and the output rotation speed coincide with each other.

As shown in FIG. 2, in the first gear, the SOWC 63 is in the engaged state, the SOWC 64 is in the released state, and the clutch 61 is in the released state.

When the motor 2 (see FIG. 1) is driven, the input shaft 3 rotates in the one direction DA around the rotation axis X as shown in FIG. 4. The one direction DA means a rotation direction when the vehicle travels forward. The one direction DA can be, for example, a counterclockwise direction. The other direction DB is a clockwise direction when the one direction DA is counterclockwise.

By engaging the SOWC 63, the second carrier 55 of the second gear mechanism 50 and the first ring gear 42 of the first gear mechanism 40 connected to the second carrier 55 are non-rotatably fixed to the gear case 12. Therefore, the pinion gear 53 held by the second carrier 55 does not revolve and rotates in the other direction DB. In FIGS. 4 to 6, arrows indicate only revolution directions of the pinion gears 43 and 53, and rotation directions thereof are omitted.

The second ring gear 52 idles in the other direction DB due to the rotation of the pinion gear 53.

Thus, since the second carrier 55 and the first ring gear 42 are fixed in the first gear, the rotation input to the second sun gear 51 of the second gear mechanism 50 is not output to the first gear mechanism 40.

In the first gear mechanism 40, the first sun gear 41 rotates in the one direction DA, and the first ring gear 42 is non-rotatably fixed. The pinion gear 43 meshing with the first sun gear 41 and the first ring gear 42 rotates in the other direction DB while revolving in the one direction DA. Due to the revolution of the pinion gear 43, the first carrier 45 rotates in the one direction DA. The rotation of the first carrier 45 is output to the output shaft 7.

As shown in FIG. 3, in the first gear, the first ring gear 42 is fixed and the speed of rotation is zero, so that the gear ratio (OUT/IN) is small. Accordingly, in the first gear, the rotation input by first sun gear 41 is significantly decelerated, and the output rotation speed is the lowest among first to third gears.

As shown in FIG. 2, in the second gear, the SOWC 63 is in the released state, the SOWC 64 is in the engaged state, and the clutch 61 is in the released state.

As shown in FIG. 5, the first sun gear 41 of the first gear mechanism 40 and the second sun gear 51 of the second gear mechanism 50 rotate integrally with the input shaft 3 in the one direction DA.

When the SOWC 64 is in the engaged state, the second ring gear 52 of the second gear mechanism 50 is non-rotatably fixed to the gear case 12. The pinion gear 53 meshing with the second sun gear 51 rotating in the one direction DA and the fixed second ring gear 52 rotates in the other direction DB while revolving in the one direction DA. The second carrier 55 rotates in the one direction DA by the revolution of the pinion gear 53. The first ring gear 42 of the first gear mechanism 40 which is connected to the second carrier 55 also rotates in the one direction DA. That is, the rotation output from the second carrier 55 of the second gear mechanism 50 is input to the first ring gear 42 of the first gear mechanism 40.

The speed of the rotation input to the first ring gear 42 is changed at a small gear ratio of the second gear mechanism 50. As shown in FIG. 3, the rotation speed of the first ring gear 42 is lower than the rotation speed of the first sun gear 41.

As shown in FIG. 5, due to a difference in rotation speed between the first sun gear 41 and the first ring gear 42, the pinion gear 43 rotates in the other direction DB while revolving in the one direction DA. The first carrier 45 rotates in the one direction DA by the revolution of the pinion gear 43. The rotation of the first carrier 45 is output to the output shaft 7.

Thus, in the second gear, the rotation decelerated by the second gear mechanism 50 is input to the first ring gear 42 of the first gear mechanism 40 via the second carrier 55, and thus the first ring gear 42 rotates at a speed slower than the input rotation speed. Accordingly, as shown in FIG. 3, at the second gear, the gear ratio (OUT/IN) is higher than that of the first gear in which the first ring gear 42 is fixed and does not rotate. The output rotation speed of the second gear is higher than the output rotation speed of the first gear and lower than the output rotation speed which is the same as the input rotation speed of the third gear.

In the second gear, the SOWC 63 may be in the engagement state instead of in the released state. In this case, the second carrier 55 and the first ring gear 42 can rotate only in the one direction DA.

As shown in FIG. 2, in the third gear, the SOWC 63 and the SOWC 64 are in the released state, and the clutch 61 is in the engaged state.

As shown in FIG. 6, the first sun gear 41 of the first gear mechanism 40 and the second sun gear 51 of the gear mechanism 4 rotate integrally with the input shaft 3 in the one direction DA.

When the clutch 61 is in the engaged state, the second carrier 55 of the second gear mechanism 50 is directly connected to the input shaft 3. In other words, the first sun gear 41 fixed to the input shaft 3 and the first ring gear 42 connected to the second carrier 55 are connected by the clutch 61 as the lock-up clutch.

Accordingly, the first sun gear 41 and the first ring gear 42 of the first gear mechanism 40 rotate in the one direction DA at the same rotation speed as the input shaft 3. The pinion gear 43 meshing with the first sun gear 41 and the first ring gear 42 revolves in the one direction DA without rotating. The first carrier 45 rotates in the one direction DA at the same rotation speed as the input shaft 3 due to the revolution of the pinion gear 43. The rotation of the first carrier 45 is output to the output shaft 7.

The second carrier 55 of the second gear mechanism 50 is connected to the second sun gear 51 fixed to the input shaft 3 by the clutch 61. Accordingly, the second sun gear 51 and the second carrier 55 rotate in the one direction DA at the same rotation speed as the input shaft 3. The second ring gear 52 meshing with the pinion gear 53 held by the second carrier 55 also rotates in the one direction DA at the same rotation speed as the input shaft 3. That is, in the third gear, all six elements of the first gear mechanism 40 and the second gear mechanism 50 rotate at the same rotation speed as the input shaft 3.

Thus, the clutch 61 functions as the lock-up clutch that makes the rotation speeds of the input shaft 3 and the output shaft 7 equal. As shown in FIG. 3, in the third gear, the first ring gear 42 rotates at the same speed as the input shaft 3, and thus the gear ratio becomes 1, which is the largest. The output rotation speed of the third gear, which coincides with the input rotation speed, is the highest among the first to third gears.

In the third gear, the SOWC 63, 64 may be in the engagement state instead of the released state. In this case, the second carrier 55 and the second ring gear 52 can rotate only in the one direction DA.

In a stage of accelerating the vehicle, a large torque is required. The greater the reduction ratio (input rotation speed/output rotation speed) in the gear mechanism 4, the greater the output torque. That is, by increasing the reduction ratio, the output torque can be increased while an output of the motor is reduced.

The first sun gear 41 of the first gear mechanism 40 is an input element, the first carrier 45 is an output element, and in the first speed, the first ring gear 42 is fixed. Accordingly, it is possible to increase the output torque by increasing the reduction ratio in the first gear. By increasing the reduction ratio and increasing the torque, the output of the motor 2 can be reduced.

On the other hand, When the vehicle is cruising at a high speed, a large torque is not required, but it is desirable to reduce a mesh loss of the gear in the gear mechanism 4. Therefore, in the third gear, the clutch 61 is engaged to set the gear ratio 1 in which all the elements of the first gear mechanism 40 and the second gear mechanism 50 rotate at the same rotation speed.

Here, a case of directly switching from the first gear to the third gear without providing the second gear will be considered.

In the first gear, the first ring gear 42 and the second carrier 55 are not rotating. Further, the second ring gear 52 rotates in the other direction DB opposite to the one direction DA which is a rotation direction of the input shaft 3. When the clutch 61 is engaged in a state in which there is a large difference in rotation speed between the elements of the gear mechanism 4, a large shock occurs when the clutch 61 is engaged. It is possible to engage the clutch 61 after reducing the difference in rotation speed, but in that case, it takes time until the clutch 61 is engaged.

In the power transmission device 1, the second gear that is a middle gear position is provided between the first gear that is the lowest gear position and the third gear that is the highest gear position. Accordingly, by reducing a step ratio, the shock caused when the clutch 61 is engaged can be mitigated.

Further, when the second gear is provided, how to connect the clutch 61 (third engagement element) becomes an important consideration.

Here, the output end 61*b* of the clutch 61 can also be connected to the second ring gear 52 of the second gear mechanism 50. However, in the second gear, the second ring gear 52 is fixed by the SOWC 64 and does not rotate (see FIG. 3). Therefore, a difference in rotation speed between the second ring gear 52 and the input shaft 3 to which the input end 61*a* of the clutch 61 is connected is large, and the shock that occurs when the clutch 61 is engaged is difficult to reduce.

On the other hand, since the first ring gear 42 of the first gear mechanism 40 rotates in the second gear, a difference in rotation speed between the first ring gear 42 and the input shaft 3 is small. Accordingly, the shock that occurs when the clutch 61 is engaged can be further reduced, and an engagement time of the clutch 61 can be appropriately set.

Further, in the third gear, as described above, all the elements of the first gear mechanism 40 and the second gear mechanism 50 (first sun gear 41, first carrier 45, first ring gear 42, second sun gear 51, second carrier 55, and second ring gear 52) rotate together. At this time, since the four elements, that is, the first sun gear 41, the second sun gear 51, the second carrier 55, and the first ring gear 42, are restrained by the engagement of the clutch 61, stability of integral rotation can be improved.

When applying a skeleton (see FIG. 1) according to one aspect of the present invention to a vehicle, it is normal to first carry out tuning to determine appropriate values for the gear ratio, the step ratio, and the like.

When the tuning is performed on the skeleton in one aspect of the present invention, a torque sharing rate of the SOWC 63 engaged in the first gear is 2.174, and a torque sharing rate of the SOWC 64 engaged in the second gear is 0.792, as one of appropriate tuning ranges.

The smaller the torque sharing rate, the smaller the load imposed when the SOWC 63 and the SOWC 64 are engaged. The torque sharing rate of the SOWC 63 and the SOWC 64 in one of the above tuning ranges can be evaluated as a small value compared to a general standard. That is, the skeleton according to one aspect of the present invention has potential to reduce loads on the SOWC 63 and the SOWC 64 in a tuned skeleton.

Here, when the torque sharing rate between the SOWC 63 and the SOWC 64 becomes large as a result of tuning, it is normal to select engagement elements having high strength. In that case, a size of the engagement element increases, leading to an increase in cost. There is a technical background to this, where even a single difference in connection between the elements in the skeleton can result in a significant change in the torque sharing rate as a result of tuning.

In view of the technical background, the skeleton according to one aspect of the present invention that can reduce the load on the engagement element in the tuned skeleton can be evaluated as a good skeleton.

Hereinafter, examples of the device according to an aspect of the present invention will be listed.

(1) The power transmission device 1 (device) includes the first planetary gear mechanism 40 and the second planetary gear mechanism 50.

The first planetary gear mechanism 40 includes the first sun gear 41 connected to the input shaft 3, the first carrier 45 connected to the output shaft 7, and the first ring gear 42.

The second planetary gear mechanism 50 includes the second sun gear 51 connected to the input shaft 3, the second carrier 55 connected to the gear case 12 (first fixed element) via the SOWC 63 (first engagement element), and the second ring gear 52 connected to the gear case 12 (second fixed element) via the SOWC 64 (second engagement element).

The first planetary gear mechanism 40 and the second planetary gear mechanism 50 are connected by the first ring gear 42 and the second carrier 55. For example, the first connecting portion 55*b* of the second carrier 55, which is the output element of the second planetary gear mechanism 50, is connected to the first ring gear 42.

The first sun gear 41 and the first ring gear 42 are connected by the clutch 61 (third engagement element). For example, the input end 61*a* of the clutch 61 is fixed to the input shaft 3, and the output end 61*b* is fixed to the first connecting portion 55*b* of the second carrier 55. The first sun gear 41 is fixed to the input shaft 3, and the first connecting portion 55*b* is connected to the first ring gear 42. Therefore, the first sun gear 41 and the first ring gear 42 are connected to the clutch 61 via the input shaft 3 and the first connecting portion 55*b*.

According to an aspect of the present invention, it is possible to reduce the shock that occurs when the clutch 61 is engaged, and also to appropriately set the time until the clutch 61 is engaged with such a configuration.

Specifically, according to an aspect of the present invention, the second gear position (gear ratio:medium) can be set between the first gear position (gear ratio:small) in which the first ring gear 42 is fixed and the third gear position (gear ratio:large) in which the first ring gear 42 rotates integrally with the input shaft 3 with such a configuration.

Further, in one aspect of the present invention, the clutch 61 is connected to the first ring gear 42 rotating in the second gear position, rather than to the second ring gear 52 of the second planetary gear mechanism 50 which is fixed in the second gear position. Accordingly, it is possible to reduce a difference in rotation speed between an input end 61*a* side and an output end 61*b* side immediately before the clutch 61 is engaged. Accordingly, it is possible to reduce the shock that occurs when the clutch 61 is engaged, and also to more appropriately set the time until the clutch 61 is engaged.

Further, in the third gear position, among the six elements of the first planetary gear mechanism 40 and the second planetary gear mechanism 50, the four elements, that is, the first sun gear 41, the second sun gear 51, the second carrier 55, and the first ring gear 42 can be restrained by the clutch 61. Accordingly, rotational stability is improved when all the elements of the first planetary gear mechanism 40 and the second planetary gear mechanism 50 are rotated integrally in the third gear position.

Although the example in which the first fixed element and the second fixed element are the gear case 12 has been described, the present invention is not limited to this aspect. At least one of the first fixed element and the second fixed element may be a fixing member provided separately from the gear case 12.

(2) The value (λ value) obtained by dividing the number of teeth of the first sun gear 41 of the first planetary gear mechanism 40 by the number of teeth of the first ring gear 42 is smaller than the value (λ value) obtained by dividing the number of teeth of the second sun gear 51 of the second planetary gear mechanism 50 by the number of teeth of the second ring gear 52.

In the planetary gear mechanism, the smaller the λ value, the larger the gear ratio. That is, the gear ratio of the first planetary gear mechanism 40 is larger than the gear ratio of the second planetary gear mechanism 50. By increasing the gear ratio of the first planetary gear mechanism 40, the gear ratio can be reduced in the first gear position in which the first ring gear 42 is fixed, and an output torque from the gear mechanism 4 to the output shaft 7 can be increased.

(3) In the power transmission device 1, at least one of the first engagement element and the second engagement element can be a selectable one way clutch.

The selectable one way clutch does not generate drag resistance like a multi-disc clutch or a band brake, and therefore can reduce friction when engaged. Since the selectable one way clutch includes the waiting mechanism that accumulates the thrust applied from the actuator, the selectable one way clutch can be quickly switched between the released state, the engaged state, and the engagement state. Accordingly, the power transmission device 1 can improve controllability.

Although the example in which both the first engagement element and the second engagement element are the selectable one way clutches 63 and 64 has been described, the present invention is not limited to this aspect. Any one of the first engagement element and the second engagement element may be a selectable one way clutch, and the remaining one may be another engagement element such as a multi-disc clutch.

(4) In the power transmission device 1, the clutch 61 can be operated by the electric actuator 62.

By using the electric actuator 62 to operate the clutch 61, responsiveness of the clutch 61 can be improved. Further, when a hydraulic actuator is adopted, it is necessary to mount an oil pump, oil, and the like, and this raises concerns about an increase in weight of the power transmission device 1. By using the electric actuator 62, a weight of the power transmission device 1 can be reduced.

(5) In the power transmission device 1, the first planetary gear mechanism 40 can be disposed between the second planetary gear mechanism 50 and the motor 2 (rotation electrical machine) in the direction of the rotation axis X (axial direction) of the input shaft 3.

With this configuration, the output shaft 7 connected to the first carrier 45 of the first planetary gear mechanism 40 can be folded back toward the motor 2 side. When the output shaft 7 has the folded structure, an extra space is likely to be created on an opposite side of the input shaft 3 and the output shaft 7 in the direction of the rotation axis X. Further, by partially overlapping the input shaft 3 and the output shaft 7 in the radial direction, an axial length can be shortened. Further, the output shaft 7 can be disposed in the central portion of the power transmission device 1 in the direction of the rotation axis X. Accordingly, the differential mechanism 9 connected to the output shaft 7 can be disposed in the central portion of the drive shaft D in the direction of the rotation axis X. Since the differential mechanism 9 is disposed at the central portion of the drive shaft D connected to the left and right driving wheels K, K of the vehicle, balance of the vehicle can be improved.

(6) The power transmission device 1 includes, for example, the electric actuator 62 disposed at a position overlapping with the first planetary gear mechanism 40 and the second planetary gear mechanism 50 in the axial direction.

With such a configuration, the power transmission device 1 can reduce an increase in size in the radial direction. In particular, in the structure in which the output shaft 7 is folded back toward the input shaft 3, the space is likely to be created on the opposite side of the input shaft 3 and the output shaft 7 in the direction of the rotation axis X. For example, by disposing the electric actuator 62 in this space, the space can be effectively utilized, which is advantageous in layout.

First Modification

Figure 7:
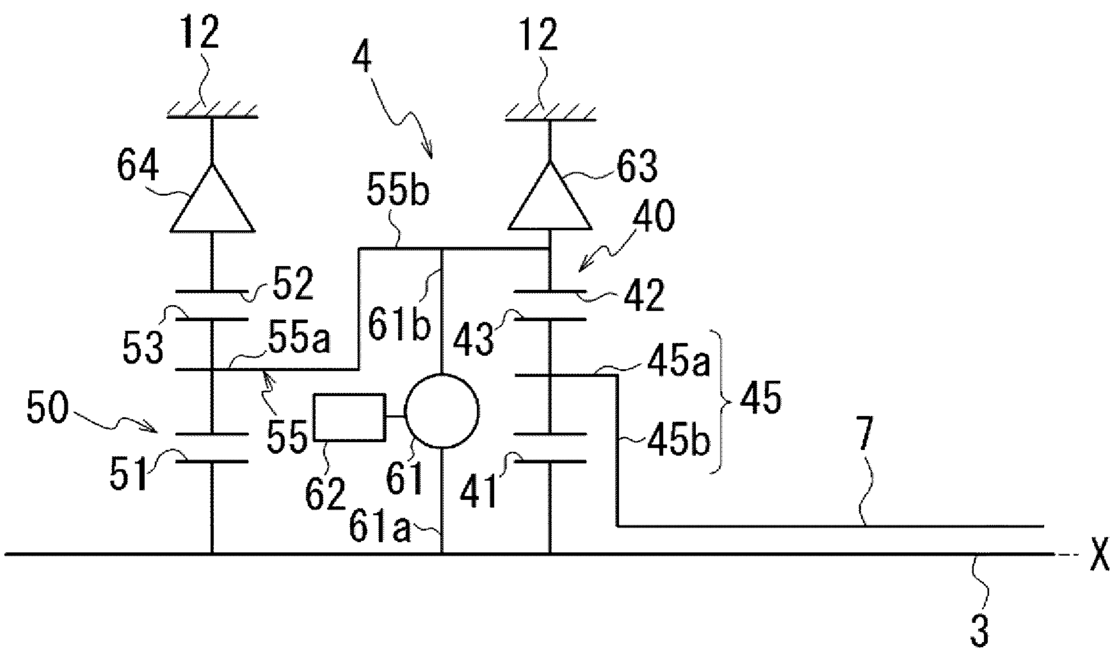
FIG. 7 is a skeleton diagram showing a gear mechanism according to a first modification.

FIG. 7 is a skeleton diagram showing the gear mechanism 4 according to a first modification.

Since an overall configuration of the power transmission device 1 according to the first modification is the same as that of the above-described embodiment, FIG. 7 illustrates only the gear mechanism 4.

In the above-described embodiment, as shown in FIG. 1, the example in which the SOWC 63 (first engagement element) is connected to the second connecting portion 55*c* of the second carrier 55 has been described, the present invention is not limited to this aspect. Since the first connecting portion 55*b* of the second carrier 55 is connected to the first ring gear 42, the SOWC 63 may be provided in either the second carrier 55 or the first ring gear 42.

For example, as shown in FIG. 7, the SOWC 63 as the first engagement element may be provided in manner of being connected to an outer periphery of the first ring gear 42. In this case, the second connecting portion 55*c* of the second carrier 55 may not be provided.

In the first modification, the second carrier 55 is connected to the gear case 12 (first fixed element) via the SOWC 63 (first engagement element). Specifically, the second carrier 55 is connected to the gear case 12 (first fixed element) via the first ring gear 42 and the SOWC 63 (first engagement element).

In the first modification, the second carrier 55 and the first ring gear 42 can also be non-rotatably fixed by engaging the SOWC 63 in the first gear as in the above-described embodiment.

The SOWC 63 (first engagement element) may be connected to the first connecting portion 55*b* of the second carrier 55. In this case, the second carrier 55 and the first ring gear 42 can also be non-rotatably fixed by engaging the SOWC 63 in the first gear as in the above-described embodiment.

Second Modification

Figure 8:
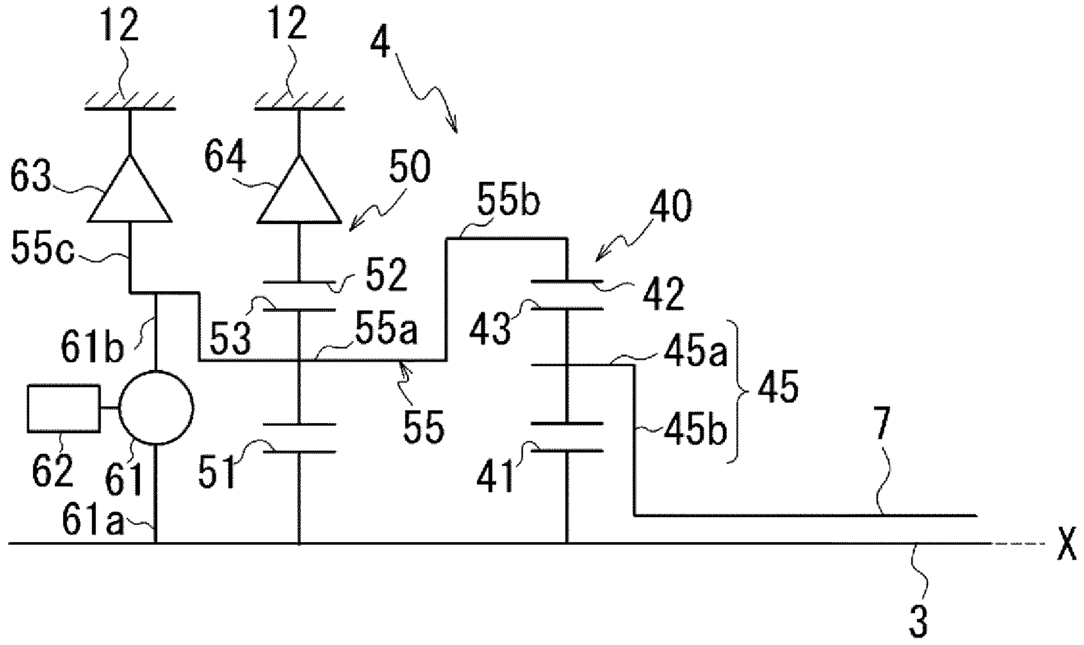
FIG. 8 is a skeleton diagram showing a gear mechanism according to a second modification.

FIG. 8 is a skeleton diagram showing the gear mechanism 4 according to a second modification.

Since an overall configuration of the power transmission device 1 according to the second modification is the same as that of the above-described embodiment, FIG. 8 illustrates only the gear mechanism 4.

In the above-described embodiment, the example in which the input end 61*a* of the clutch 61 (third engagement element) is connected to the input shaft 3 and the output end 61*b* is connected to the first connecting portion 55*b* of the second carrier 55 has been described, but the present invention is not limited to this aspect. The clutch 61, which is the third engagement element, may be any clutch as long as the first sun gear 41 and the first ring gear 42 can be integrally rotatably connected in the third gear.

For example, as shown in FIG. 8, the output end 61*b* of the clutch 61 may be connected to the second connecting portion 55*c* of the second carrier 55. The input end 61*a* of the clutch 61 is fixed to the input shaft 3. The first sun gear 41 is fixed to the input shaft 3, and the second connecting portion 55*c* is connected to the first ring gear 42 via the holding portion 55*a* and the first connecting portion 55*b*. Therefore, in the first modification, the first sun gear 41 and the first ring gear 42 are also connected to the clutch 61 (third engagement element).

In the second modification, by engaging the clutch 61 in the third gear, the four elements, that is, the first sun gear 41, the second sun gear 51, the second carrier 55, and the first ring gear 42 are restrained by the clutch 61 and integrally rotated.

The input end 61*a* of the clutch 61, which is the third engagement element, may be connected to the first sun gear 41 or the second sun gear 51 instead of the input shaft 3. The output end 61*b* of the clutch 61 may be connected to the first ring gear 42.

In the second modification, as shown in FIG. 8, the clutch 61 or the electric actuator 62 is disposed on one side in the direction of the rotation axis X (axial direction) with the first planetary gear mechanism 40 and the second planetary gear mechanism 50 interposed therebetween, and an element and the motor 2 (see FIG. 1) connected to the differential mechanism 9 are disposed on the other side. The clutch 61 or the electric actuator 62 is disposed so as to overlap with the first planetary gear mechanism 40 or the second planetary gear mechanism 50 in the direction of the rotation axis X.

With such a configuration, the power transmission device 1 according to the second modification can reduce an increase in size in the radial direction of the rotation axis X. In particular, in a structure in which the output shaft 7 is folded back toward the input shaft 3, a space is likely to be created on the opposite side of the input shaft 3 and the output shaft 7 in the direction of the rotation axis X. For example, by disposing the clutch 61 or the electric actuator 62 in this space, the space can be effectively utilized, which is advantageous in layout.

In the second modification, the element connected to the differential mechanism 9 is disposed between the first planetary gear mechanism 40 or the second planetary gear mechanism 50 and the motor 2 and sandwiched in the axial direction. With such a configuration, the motor 2 and the gear mechanism 4 are disposed on both sides of the differential mechanism 9, and thus weight balance of the entire device can be improved. Although the improvement in weight balance can be achieved with configurations other than that shown in FIG. 8, the second modification is particularly suitable when the weight balance is improved in this way. As shown in FIG. 8, the power transmission device 1 includes the clutch 61 or the electric actuator 62 located further back than the first planetary gear mechanism 40 or the second planetary gear mechanism 50, in which the space can be more easily ensured, which is advantageous in layout.

In the configuration of the second modification shown in FIG. 8, for example, as shown in FIG. 1, the clutch 61 or the electric actuator 62 is not sandwiched between the two planetary gear mechanisms 40, 50. Therefore, a gap between the two planetary gear mechanisms 40, 50 can be packed. Accordingly, for example, it is advantageous to increase a degree of freedom in design in terms of layout and shaft support for the two planetary gear mechanisms 40, 50.

In the present embodiment, the example in which the device according to an aspect of the present invention is applied to the power transmission device 1 mounted on the vehicle has been described, the present invention is not limited to this aspect. The device according to an aspect of the present invention can be applied to one other than the vehicle. When a plurality of examples and modifications are described in the present embodiment, these examples and modifications may be freely combined.

Although the embodiment of the present invention has been described above, the above embodiment is merely an application example of the present invention and is not intended to limit the technical scope of the present invention to the specific configuration of the above embodiment. The embodiment can be changed as appropriate within the scope of the technical idea of the invention.

The present application claims a priority of Japanese Patent Application No. 2022-035857 filed with the Japan Patent Office on Mar. 9, 2022, all the contents of which are hereby incorporated by reference.

DESCRIPTION OF REFERENCE SIGNS

1 power transmission device (device)
2 motor (rotation electrical machine)
3 input shaft
7 output shaft
12 gear case (first fixed element, second fixed element)
40 first planetary gear mechanism (first gear mechanism)
41 first sun gear
42 first ring gear
45 first carrier
50 second planetary gear mechanism (second gear mechanism)
51 second sun gear
52 second ring gear 52
55 second carrier
61 clutch (third engagement element)
62 electric actuator
63 selectable one way clutch (SOWC) (first engagement element)
64 selectable one way clutch (SOWC) (second engagement element)
X rotation axis (axis)

The invention claimed is:

1. A device comprising:

a first planetary gear mechanism including a first sun gear connected to an input shaft, a first carrier connected to an output shaft, and a first ring gear;

a second planetary gear mechanism including a second sun gear connected to the input shaft, a second carrier connected to a first fixed element via a first engagement element, and a second ring gear connected to a second fixed element via a second engagement element; and a third engagement element connecting the input shaft and the second carrier, wherein the first ring gear is connected to the second carrier so as to be integrally rotatable therewith, the third engagement element is provided between the first sun gear and the first ring gear, and the first planetary gear mechanism is disposed between a rotation electrical machine and the second planetary gear mechanism in an axial direction of the input shaft.

2. The device of claim 1, wherein a value obtained by dividing a number of teeth of the first sun gear by a number of teeth of the first ring gear is smaller than a value obtained by dividing a number of teeth of the second sun gear by a number of teeth of the second ring gear.

3. The device of claim 1, wherein at least one of the first engagement element and the second engagement element is a selectable one way clutch.

4. The device of claim 1, wherein the third engagement element is operated by an electric actuator.

5. The device of claim 1, wherein the second carrier includes a holding portion holding a pinion gear, a first connecting portion connected to a first side of the holding portion, and a second connecting portion connected to a second side of the holding portion, and the second connecting portion of the second carrier is connected to the first fixed element via the first engagement element.

6. The device of claim 5, wherein the third engagement element connects the input shaft and the second connecting portion of the second carrier.

7. The device of claim 1, wherein the first engagement element and the second engagement element are arranged side-by-side in the axial direction of the input shaft.

8. A device comprising:

a first planetary gear mechanism including a first sun gear connected to an input shaft, a first carrier connected to an output shaft, and a first ring gear;

a second planetary gear mechanism including a second sun gear connected to the input shaft, a second carrier connected to a first fixed element via a first engagement element, and a second ring gear connected to a second fixed element via a second engagement element; and a third engagement element connecting the input shaft and the second carrier, wherein the first ring gear is connected to the second carrier so as to be integrally rotatable therewith, the third engagement element is provided between the first sun gear and the first ring gear, and an electric actuator disposed at a position overlapping with the first planetary gear mechanism and the second planetary gear mechanism in an axial direction.

9. The device of claim 8, wherein a value obtained by dividing a number of teeth of the first sun gear by a number of teeth of the first ring gear is smaller than a value obtained by dividing a number of teeth of the second sun gear by a number of teeth of the second ring gear.

10. The device of claim 8, wherein at least one of the first engagement element and the second engagement element is a selectable one way clutch.

11. The device of claim 8, wherein the third engagement element is operated by an electric actuator.

12. The device of claim 8, wherein the second carrier includes a holding portion holding a pinion gear, a first connecting portion connected to a first side of the holding portion, and a second connecting portion connected to a second side of the holding portion, and the second connecting portion of the second carrier is connected to the first fixed element via the first engagement element.

13. The device of claim 12, wherein the third engagement element connects the input shaft and the second connecting portion of the second carrier.

14. The device of claim 8, wherein the first engagement element and the second engagement element are arranged side-by-side in the axial direction of the input shaft.

* * * * *